United States Patent [19]

Sakaguchi

[11] Patent Number: 5,302,277
[45] Date of Patent: Apr. 12, 1994

[54] PROCESS FOR PRODUCING PARAFORMALDEHYDE OF HIGH FORMALDEHYDE CONTENT

[75] Inventor: Yasuhiko Sakaguchi, Shimonoseki, Japan

[73] Assignee: Mitsui Toatsu Chemicals, Incorporated, Tokyo, Japan

[21] Appl. No.: 796,609

[22] Filed: Nov. 22, 1991

[30] Foreign Application Priority Data

Nov. 28, 1990 [JP] Japan .................................. 2-323132

[51] Int. Cl.$^5$ ............................................. C01B 31/00
[52] U.S. Cl. ............................. 204/157.43; 204/157.6; 204/157.93
[58] Field of Search ................... 204/157.43, 158.21, 204/157.6, 157.93

[56] References Cited

U.S. PATENT DOCUMENTS 4,356,071 10/1982 Fenton ........................... 204/159.21

FOREIGN PATENT DOCUMENTS 2-167244 6/1990 Japan .
2211842 7/1989 United Kingdom .

*Primary Examiner*—John Niebling
*Assistant Examiner*—C. Delacroix-Muirheid
*Attorney, Agent, or Firm*—Burns, Doane, Swecker & Mathis

[57] ABSTRACT

Paraformaldehyde of high formaldehyde content is produced by cooling and solidifying a 78-83 wt. % aqueous formaldehyde solution, and drying the resulting paraformaldehyde by means of microwave heating.

4 Claims, No Drawings

PROCESS FOR PRODUCING PARAFORMALDEHYDE OF HIGH FORMALDEHYDE CONTENT

BACKGROUND OF THE INVENTION

1. Field of the Invention

The present invention relates to a process for producing paraformaldehyde of high formaldehyde content.

2. Description of the Related Art

Heretofore, there has been commercially available paraformaldehyde containing about 80% by weight of formaldehyde (hereinafter, "% by weight" is simply called "%"). However, paraformaldehyde of high formaldehyde content has been recently demanded as a starting material for phenolic resins, urea resins, melamine resin, polyacetal and the like. Paraformaldehyde containing 90-94% of formaldehyde is now produced and moreover, paraformaldehyde containing 95% or more of formaldehyde can be produced.

When paraformaldehyde is used as a starting material for the above mentioned products, the paraformaldehyde is used in the form of a highly concentrated formaldehyde by dissolving it in warm water, hot water or various solvents, and therefore, paraformaldehyde is required to be highly soluble in warm water, hot water and the like.

As a method for producing a paraformaldehyde of a high formaldehyde content (hereinafter referred to as "high concentration paraformaldehyde"), the following is known. That is, formalin containing about 37-50% of formaldehyde is subjected to a concentration treatment such as vacuum concentration to produce a highly concentrated aqueous solution of formaldehyde containing about 80% of formaldehyde, and the resulting highly concentrated aqueous solution of formaldehyde is cooled and solidified by means of a cooling apparatus and a pelletizing column to form paraformaldehyde containing about 78-83% of formaldehyde in the form of particles or flakes (hereinafter referred to as "conventional paraformaldehyde"). Then the resulting conventional paraformaldehyde is dried at a temperature not higher than the softening point of the conventional paraformaldehyde by means of hot air drying or far infrared ray drying [Japanese Patent Application Laid-open No. Hei 2-167244 (1990)].

However, when conventional paraformaldehyde is dried by means of far infrared ray drying to produce a high concentration paraformaldehyde, the solubility of the high concentration paraformaldehyde in warm water or hot water becomes gradually lower with the lapse of time. That is, a high concentration paraformaldehyde immediately after the production and that stored for a long period of time, e.g. 30 days or more, after the production exhibit a big difference in solubility in warm water or hot water (hereinafter called "warm water-solubility").

Such difference in warm water-solubility is problematic when a high concentration paraformaldehyde is practically used.

In the case where only far infrared ray drying is employed, it is difficult to uniformly dry a somewhat thick material or superposed materials since far infrared ray can not inherently penetrate into a deep portion of materials, i.e. the penetration depth is usually 1 mm or less.

As a result, the degrees of drying states at the surface and the inside of a layer are different from each other, and therefore, there are produced materials of high degree of polymerization and, in a manner similar to hot air drying, the solubility in warm water or hot water becomes poor.

Furthermore, the degree of absorption of far infrared rays by paraformaldehyde is so high that the of paraformaldehyde in the form of particles or flakes is partly melted, and the particles or flakes become attached to each other to become a mass and it is not possible to dry uniformly the inside of the mass resulting in fluctuations in the degree of polymerization.

When such high concentration paraformaldehyde having poor solubility in warm water or hot water and fluctuation in the degree of polymerization is used for producing phenolic resins, such drawbacks adversely affect the condensation reaction with phenols resulting in a lower quality of the phenolic resins thus produced.

A standard for determining the degree of solubility of paraformaldehyde in warm water and hot water is "warm water-solubility". The warm water-solubility is determined by adding paraformaldehyde to a deionized water adjusted to 80° C. in such an amount that the content of formaldehyde in water is 20%, stirring the resulting mixture until the paraformaldehyde is completely dissolved, and measuring the time required to be completely dissolved. This time is the warm water-solubility. This time is correlated with the degree of polymerization of the paraformaldehyde, and the longer this time, the higher the degree of polymerization.

When the turbidity of the resulting solution containing paraformaldehyde is 50 or less in terms of standard turbidity, the paraformaldehyde is deemed to be completely dissolved in water.

Depending on the use of the paraformaldehyde, the solubility may be determined by using butanol or the like in place of warm water.

Warm water-solubility of paraformaldehyde becomes gradually poor with the lapse of time after the production of the paraformaldehyde, and the higher the concentration of formaldehyde in paraformaldehyde, the poorer the warm water-solubility becomes.

Warm water-solubility of conventional paraformaldehyde (containing about 80% formaldehyde) is about 1-5 min. immediately after the production thereof by cooling and solidifying procedures, but 5-15 min. after 24 hours from the production, 20-40 min. after 10 days from the production, and 30-60 min. after 30 days from the production, and when longer than 30 days, the time of warm water-solubility increases gradually.

When conventional paraformaldehyde is dried by using a far infrared ray heating apparatus, warm water-solubility of the resulting high concentration paraformaldehyde is about 1-5 min. immediately after drying, 5-15 min. after 24 hours from drying, about 10-20 min. after 10 days from drying, undesirably as long as about 40-100 min. after 30 days from drying, and after longer than 30 days from drying, the time increases gradually.

SUMMARY OF THE INVENTION

An object of the present invention is to provide a high concentration paraformaldehyde having good warm water-solubility.

A further object of the present invention is to provide a process for producing a high concentration paraformaldehyde exhibiting good warm water-solubility even after a long time from the production.

According to the present invention, there is provided a process for producing paraformaldehyde containing at least 88% by weight of formaldehyde by drying paraformaldehyde obtained by cooling and solidifying a 78-83 wt. % aqueous formaldehyde solution which comprises effecting the drying by means of microwave heating.

DESCRIPTION OF THE PREFERRED EMBODIMENTS

The process of the present invention as mentioned above is preferably carried out by, additionally, passing air at a temperature of 30-60° C. through the paraformaldehyde for 30-240 min. to make the softening point of the paraformaldehyde 60° C. or higher or the formaldehyde content 86% or more before the microwave heating for drying.

The microwave heating of the present invention is preferably carried out while air at a temperature of 30-100° C. is passed through the paraformaldehyde.

Further the microwave heating is preferably carried out while the paraformaldehyde is fluidized.

Far infrared ray heating may be carried out simultaneously with or after the microwave heating in the present invention.

Furthermore, the above-mentioned embodiments may be employed at least partly in combination according to the present invention.

In the present invention, there may be used a microwave having a very short wavelength of 1 mm-1 m, and frequencies of 300 MHZ-30 GHZ which is a kind of electromagnetic waves called "super high frequency" or "ultrasuper high frequency".

The microwave generally available in industry is that of 2450 MHZ, 5800 MHZ or 24125 MHZ, and mainly 2450 MHZ is used.

When paraformaldehyde is placed in an electric field of microwave, polar molecules (molecules having electric dipole, such as water and the like) constituting paraformaldehyde vigorously vibrate and rotate so as to orient in the electric field. These motions cause collision and friction between molecules to generate heat and the inside and the outside temperatures of the paraformaldehyde rapidly rise.

The principle of microwave heating can be briefly shown as follows: microwave energy→vibrating and rotating motions of dipole→heat energy→rapid rise of the sample temperature.

For drying by microwave heating and drying by far infrared ray heating in the present invention, there may be used ordinary microwave heating apparatus and far infrared ray heating apparatus, respectively, and the types are not particularly critical.

An example of a microwave heating apparatus has a fundamental structure including a microwave oscillator generating a microwave energy (magnetron) and a cavity oven irradiating a body to be heated with microwave are connected with attachments such as isolators, power monitors and matching devices through wave guides. The cavity oven is a closed metal box, and there are a batch type and a conveyer type, but any of them may be used in the present invention.

Far infrared rays which may be used together with microwave heating in the present invention have a wavelength region of about 5.6-1000 μm in the range of infrared rays and are a kind of electromagnetic waves. In actual industry, a wavelength region of 2-25 μm is mainly used. When paraformaldehyde is irradiated with the far infrared ray, it is directly absorbed into the paraformaldehyde to be heated as a radiant heat to transfer heat.

Each substance has its own particular wavelengths which correspond to its inherent vibrating and rotating motions. The wavelengths vary with substance depending on the masses of the atoms constituting the substance, the structural configuration and the state of arrangement of the atoms, and bonding force in the molecule.

When a substance is irradiated with far infrared rays and the frequency of the far infrared rays corresponds to the inherent vibrating and rotating motions, the molecule of the substance absorbs the far infrared ray energy so that the vibration and rotation become more vigorously to generate heat. This is known as a "resonance absorption phenomenon".

When the substance to be dried contains a large amount of water, microwave heating is effective. However, as the drying progresses, the water content decreases in the substance and thereby, the effect of microwave decreases. Therefore, it is preferable to utilize the characteristics of far infrared rays for drying together with microwave, and thereby the water content can be further reduced.

In this way, both electromagnetic energy of microwave and that of far infrared ray are absorbed to paraformaldehyde to generate heat when both electromagnetic energies are projected to paraformaldehyde, and thereby paraformaldehyde is dried. Since this heat generation by each electromagnetic energy occurs almost uniformly in the paraformaldehyde, drying of paraformaldehyde can be uniformly carried out without any difference between the surface layer and the inside portion.

According to the present invention, microwave generated, for example, by the above-mentioned microwave generating apparatus may be used for irradiating conventional paraformaldehyde to dry it. Conventional paraformaldehyde may be dried immediately after it is produced by cooling and solidifying a highly concentrated aqueous formaldehyde solution.

However, in such a case, the conventional paraformaldehyde placed in a microwave apparatus has a softening point as low as 50-60° C. and therefore, it is preferable to carry out drying such that the temperature of the paraformaldehyde does not exceed said softening point at the beginning of drying. As drying proceeds, the concentration of formaldehyde increases and thereby the softening point of paraformaldehyde becomes higher. As a result, it becomes possible to effect drying by elevating the temperature of the paraformaldehyde to be dried.

In the case of drying by means of microwaves, the control of the drying temperature can be easily effected by starting or stopping microwave oscillation, or increasing or decreasing the output, and furthermore, the control can be also effected by controlling the flow rate of air passing through the paraformaldehyde and the temperature of air. In particular, when the conventional paraformaldehyde produced by cooling and solidifying a concentrated aqueous formaldehyde solution is dried, it is easier to control the conditions of air passing through the paraformaldehyde for the purpose of drying.

The following drying procedure is preferable. Conventional paraformaldehyde is placed in an apparatus kept at 30-80° C. which is lower than the softening point of the paraformaldehyde, preferably 40–50° C. and air is passed through the conventional paraformaldehyde at a flow rate of 0.01 m/s or more based on the empty column for 30–240 min. and thereby the softening point of the conventional paraformaldehyde can be elevated.

When the temperature inside the apparatus is 30° C. or lower, it takes a long time to elevate the softening point. When the temperature exceeds 60° C., the temperature becomes higher than the softening point of paraformaldehyde and as a result, paraformaldehyde is liable to partly melt to form a mass and the drying state becomes non-uniform.

In the procedure of elevating the softening point of paraformaldehyde, the air-passing procedure may be carried out in combination with the microwave oscillation and this combination facilitates to elevate the softening point faster than the air-passing procedure alone. It is advisable that the conditions of microwave oscillation and air-passing are controlled taking into consideration the initial degree of polymerization, the softening point and the like of conventional paraformaldehyde.

It is possible to elevate a softening point of conventional paraformaldehyde by only allowing it to stand at room temperature or 30–60° C. without passing air, but it takes a long time and when the layer thickness of conventional paraformaldehyde is large, the temperature distribution in the layer is not uniform so that the resulting softening point, correlative with degree of polymerization, fluctuates.

Therefore, it is preferable to employ the air-passing procedure.

According to such a procedure, the softening point of conventional paraformaldehyde can be raised from 50–60° C. before the procedure to 70–80° C. after the procedure.

However, in the above-mentioned procedure, when conventional paraformaldehyde is subjected to the air-passing procedure at 35° C. or higher for 30–240 min., the conventional paraformaldehyde becomes somewhat softened. The fluidity of the conventional paraformaldehyde can be improved by cooling it to a temperature of 35° C. or lower with a cool wind at a temperature lower than atmospheric temperature.

When this cooling is not conducted, it is preferable to effect air-passing cooling to remove water in order to avoid undesirable phenomena that water present on the surface of the paraformaldehyde, that is, free water, is heated by microwaves and a part of the paraformaldehyde is melted in a microwaves heating drying apparatus and a portion of having a high degree of polymerization is formed in the paraformaldehyde.

An apparatus for carrying out such a method as above is not critical as to the type and for example, known band drying machine of an air circulating type may be usually used.

Then, the conventional paraformaldehyde is dried by means of a microwave heating apparatus or a combination of a microwave heating apparatus and a far infrared ray heating apparatus. In the drying procedure, air preferably at a temperature of 30–90° C. is passed through paraformaldehyde in the drying apparatus at a flow rate of 0.01 m/s or higher based on the empty column and temperature control is conducted so as not to elevate the temperature of the paraformaldehyde to the softening point of paraformaldehyde or higher.

Therefore, it is preferable to set thermometers for measuring the temperature of paraformaldehyde upon drying at two or more positions when a microwave heating apparatus and a far infrared heating apparatus are used in combination.

When the concentration of formaldehyde in paraformaldehyde in the microwave heating apparatus or the far infrared heating apparatus reaches the desired concentration or higher, it is preferable that the paraformaldehyde is immediately taken out of the apparatus, rapidly cooled by using a cool wind at a temperature lower than atmospheric temperature at a flow rate of 0.01 m/s or higher based on the empty column and sufficiently cooled until the temperature of the paraformaldehyde is lowered preferably to 30° C. or lower. The sufficient cooling after drying makes the warm water-solubility good even after the lapse of time.

Upon drying, some amount of formaldehyde in the paraformaldehyde is vaporized so that it is desirable to lead the air blown into the above-mentioned microwave heating apparatus or far infrared ray heating apparatus to the outside of the system and absorb the formaldehyde contained therein in water for recovering it.

The softening point of paraformaldehyde varies depending on the period of time during which the paraformaldehyde is allowed to stand after cooling and solidifying. Therefore, it is convenient for controlling the temperature of paraformaldehyde upon effecting the above-mentioned drying to prepare in advance a diagram showing the relationship between concentration of formaldehyde and softening point taking the above-mentioned fact into consideration.

It is important for a high concentration paraformaldehyde to have a good warm water-solubility, and since the warm water-solubility is usually liable to be deteriorated with the lapse of time, it is advantageous that the deterioration is prevented as far as possible. According to the present invention, the above-mentioned advantages can be attained.

According to the present invention, a high concentration paraformaldehyde can be produced by only heating and drying a conventional paraformaldehyde with a microwave heating apparatus The procedure is very simple.

In the present invention, a microwave heating apparatus is used to cause paraformaldehyde to generate heat and drying is carried out, and therefore, paraformaldehyde can be uniformly dried substantially without forming a difference between the surface layer and the inside portion.

As a result fluctuations in the degree of polymerization of the high concentration paraformaldehyde produced by the process of the present invention is less than that produced by conventional processes. Therefore, the high concentration paraformaldehyde produced by the present invention has a good warm water-solubility and moreover, the warm water-solubility is not deteriorated so much with the lapse of time. In addition, since the paraformaldehyde is uniformly heated, the drying can be effected at a temperature lower than conventional drying methods.

In particular, the deterioration of warm water-solubility with the lapse of time has been a big problem in the paraformaldehyde manufacturing industry. This problem has been now solved by the present invention.

Further, according to the process of the present invention, since the heat transfer to paraformaldehyde is effected by radiant heat transfer, only the paraformaldehyde is directly heated so that heat loss is very small and the thermal efficiency is better than conventional methods.

In addition, according to the present invention, conventional paraformaldehyde obtained by cooling and solidifying a highly concentrated aqueous formaldehyde solution can be directly dried.

The invention is now more particularly described with reference to the following examples which are for the purpose of illustration only and are intended to imply no limitation thereon.

EXAMPLE 1

Formalin containing 37% formaldehyde was concentrated in a vacuum and the resulting concentrated aqueous formaldehyde solution containing 80% formaldehyde at 80° C. was cooled and solidified in a pelletizing column to produce conventional paraformaldehyde in the form of particles.

The warm water-solubility of the resulting conventional paraformaldehyde is 5 min. 1000 g of the conventional paraformaldehyde was placed in a microwave drying apparatus of an air-passing type (4 liters in inner volume) and dried for 10 min. by repeating starting and stop of microwave oscillation at intervals of 5 sec. while air was sent to the microwave drying apparatus through its bottom at a flow rate of 10 liters/hr. Then there was obtained 705 g of high concentration paraformaldehyde containing 92% formaldehyde.

Drying was carried out while the gas temperature at the gas outlet of the microwave drying apparatus was kept at 40–45° C.

The air leaving the microwave drying apparatus contained formaldehyde gas so that the exhaust air was led to the outside of the system and brought into contact with water to recover formaldehyde.

The warm water-solubility of the high concentration paraformaldehyde immediately after drying was 5 min. and there was no difference in warm water-solubility between before and after the drying. The warm water-solubility after 24 hours from the drying was 10 min. and that after 30 days at 30° C. was 20 min.

EXAMPLE 2

1000 g of conventional paraformaldehyde obtained from the pelletizing column of Example 1 was placed in a warm wind circulating drier having 32 mesh wire net (20 liters in inner volume) and dried for 30 min. by circulating warm wind at 45° C. and when the content of formaldehyde in paraformaldehyde became 86%, the paraformaldehyde was placed in the microwave drying apparatus of Example 1 equipped with a 1 Kw plate type far infrared ray heater at the upper part. While air was sent into the microwave drying apparatus through the bottom at a flow rate of 10 liters/hr., drying was carried out using microwave until the formaldehyde content became 88% and then oscillation of microwave was stopped, and heating with the far infrared ray heater was started.

During the far infrared ray heating, the door of the drying apparatus was opened every 5 min. so as to agitate the paraformaldehyde, and the drying was effected for 10 min. The temperature of the exhaust gas at the outlet was 40–43° C.

The content of formaldehyde in the high concentration paraformaldehyde was 91.5%, and warm water-solubility immediately after drying was 5 min. There was no difference in warm water-solubility between before and after drying, and warm water-solubility after 24 hours from drying was 8 min. and that after 30 days from drying was 15 min.

EXAMPLE 3

1000 g of conventional paraformaldehyde produced in a way similar to Example 1 was placed in a microwave fluidized bed drying apparatus of a batch type having 32 mesh metal net (10 liters in inner volume) through which warm air at 30–100° C. could pass. Warm air at 60° C. was circulated therein at a flow rate of 1.5 m/s based on empty column for 20 min. to dry the paraformaldehyde in the microwave drying apparatus, and 775 g of paraformaldehyde containing 91.5 % formaldehyde. The resulting, paraformaldehyde was immediately cooled with a cool air at 25° C. at a flow rate of 5 m/s and the cooling was continued for 10 min. to lower the temperature of the paraformaldehyde to 29° C.

The warm water-solubility immediately after the production of the paraformaldehyde of 91.5% formaldehyde content was 3 min. The warm water-solubility after 30 days was 12 min.

COMPARISON EXAMPLE 1

1000 g of conventional paraformaldehyde obtained in Example 1 was immediately placed in a far infrared ray drying apparatus and dried while air was sent to the far infrared ray drying apparatus at a flow rate of 10 liters/hr., and 705 g of a high concentration paraformaldehyde of 92% formaldehyde content was obtained.

Drying was effected such that the conventional paraformaldehyde was dried for one hour keeping the temperature of the paraformaldehyde at 50–55° C. and then the temperature of the paraformaldehyde was raised to 70–80° C. and drying was carried out for 30 min.

Warm water-solubility of the high concentration paraformaldehyde immediately after drying was 5 min., that after 24 hours was 10 min., and that after 30 days was 40 min.

As compared with Examples 1, 2, and 3, the warm water-solubility after a long time is considerably deteriorated.

COMPARISON EXAMPLE 2

1000 g of conventional paraformaldehyde obtained in Example 1 was placed in a warm air circulating drier (20 liters in inner volume) equipped with a 32 mesh metal net and dried for 30 min. by circulating a warm air at 45° C. and the formaldehyde content in paraformaldehyde became 86%.

The resulting paraformaldehyde was dried under the same drying conditions as in Comparison Example 1 by using the same far infrared ray drying apparatus as in Comparison Example 1 to obtain 725 g of high concentration paraformaldehyde containing 91.8% formaldehyde.

The resulting high concentration paraformaldehyde was cooled until the temperature of said paraformaldehyde became 28° C. by using the same air temperature and flow rate as in Example 3.

Warm water-solubility of the resulting high concentration paraformaldehyde of 91.8% formaldehyde content immediately after the production was 5 min., that after 24 hours was 10 min., and that after 30 days was 38 min.

As compared with Comparison Example 1, the effect due to cooling after drying can be somewhat recognized, but as compared with Examples 1, 2 and 3, the warm water-solubility after a long time is deteriorated.

What is claimed is:

1. A process for producing paraformaldehyde containing at least 88% by weight of formaldehyde by drying paraformaldehyde obtained by cooling and solidifying a 78-83 wt. % aqueous formaldehyde solution which comprises effecting the drying by means of microwave heating that is carried out while air at a temperature of 30-100° C. is passed through the paraformaldehyde wherein said paraformaldehyde exhibits superior warm water solubility after 30 days compared to paraformaldehyde dried by hot air or far infrared rays.

2. The process according to claim 1 in which, before the drying by means of microwave heating, air at a temperature of 30-60° C. is passed through the paraformaldehyde for 30-240 min. to render the softening point of the paraformaldehyde 60° C. or higher or the formaldehyde content 86% by weight or more.

3. The process according to claim 1 in which the microwave heating is carried out while the paraformaldehyde is fluidized.

4. The process according to claim 1 in which far infrared ray heating is effected simultaneously with or after the microwave heating.

* * * * *